(12) United States Patent
Peck

(10) Patent No.: US 6,206,357 B1
(45) Date of Patent: Mar. 27, 2001

(54) KIT OF INTERCHANGEABLE WORKPIECE LOCATING AND HOLDING ELEMENTS

(76) Inventor: Douglas J. Peck, RR #1, Box 1927, Friendsville, PA (US) 18818

( * ) Notice: Subject to any disclaimer, the term of this patent is extended or adjusted under 35 U.S.C. 154(b) by 0 days.

(21) Appl. No.: 09/184,672

(22) Filed: Nov. 2, 1998

(51) Int. Cl.[7] .................................................. B23Q 1/08
(52) U.S. Cl. .......................................................... 269/309
(58) Field of Search ................................... 269/900, 309, 269/310, 88, 296, 47

(56) References Cited

U.S. PATENT DOCUMENTS

| 4,017,267 | | 4/1977 | Hawley . | |
|---|---|---|---|---|
| 4,073,215 | | 2/1978 | Coope et al. . | |
| 4,121,817 | * | 10/1978 | Pavlovsky | 269/900 |
| 4,586,702 | * | 5/1986 | Chambers | 269/310 |
| 5,788,225 | * | 8/1998 | Iwata et al. | 269/900 |
| 6,022,009 | * | 2/2000 | Hill | 269/310 |

* cited by examiner

Primary Examiner—Robert C. Watson
(74) Attorney, Agent, or Firm—Salzman & Levy

(57) ABSTRACT

A universal metal working kit is described. The kit has a plurality of interchangeable elements that combine with a master bushing to perform different workpiece locating and holding functions and objectives.

17 Claims, 9 Drawing Sheets

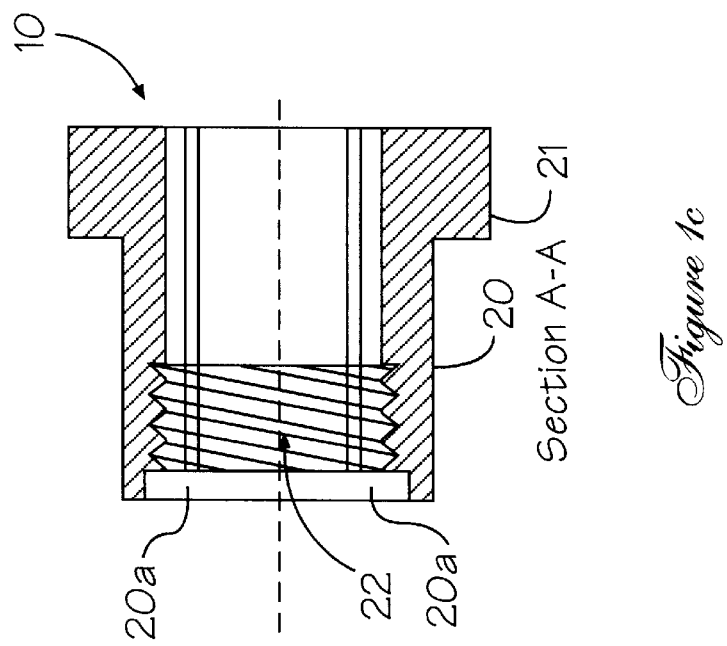
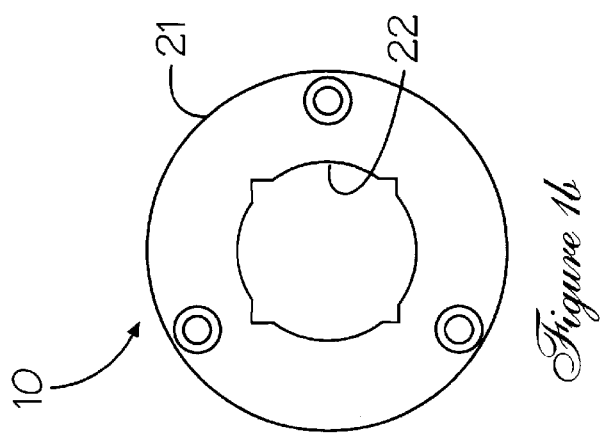
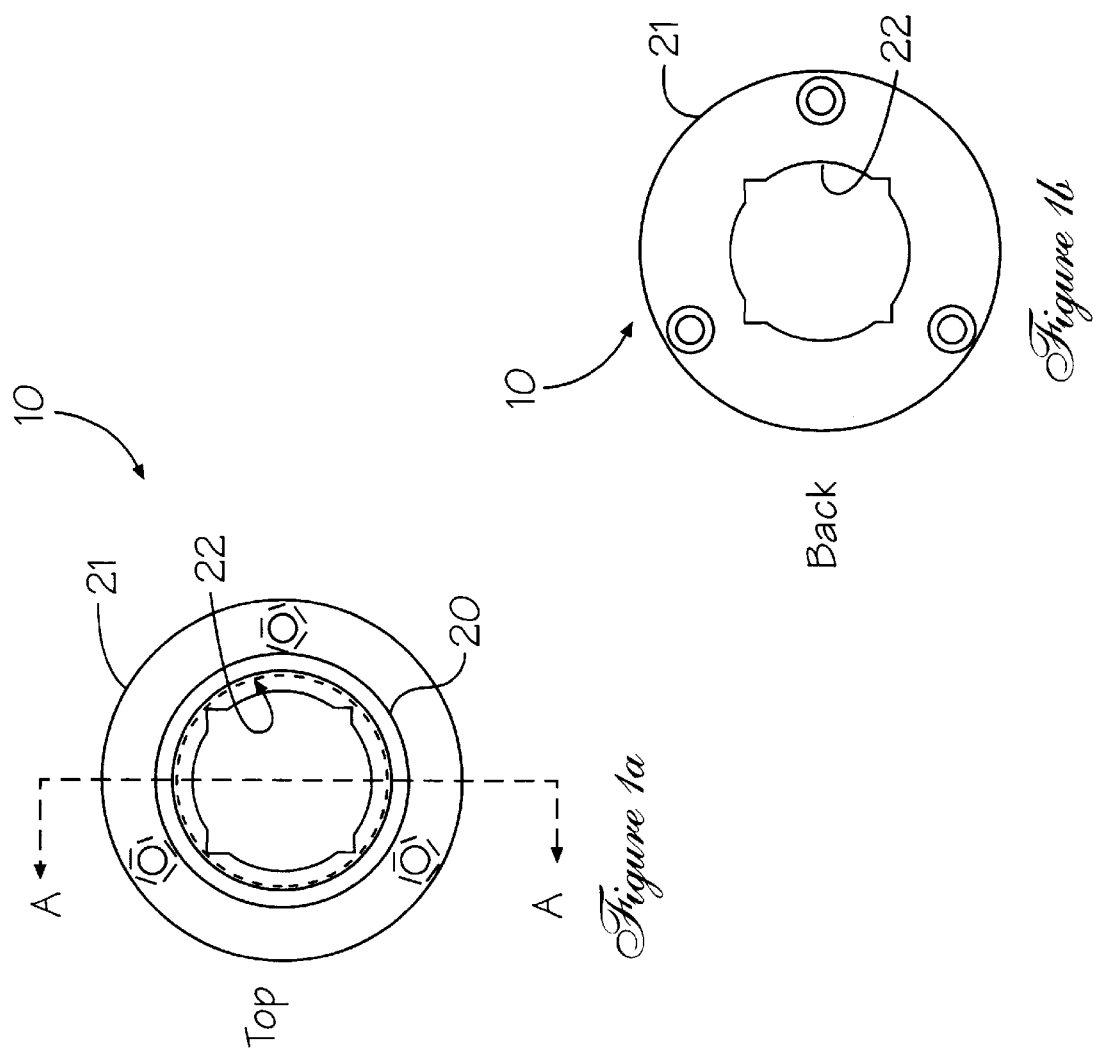
Figure 1c
Figure 1b
Figure 1a

Side

Top Plate

Top

Side

Square Nut

Top

Locating Plug

Pallet Plug

Side

Spacer

Top

KIT OF INTERCHANGEABLE WORKPIECE LOCATING AND HOLDING ELEMENTS

FIELD OF THE INVENTION

The present invention relates to workpiece handling techniques and systems and, more particularly, to a kit of interchangeable sleeves that provides a unique bushing assembly, the mating elements of which feature precise tolerances for locating and aligning different screws, pins, or tools.

BACKGROUND OF THE INVENTION

In the art of workpiece handling, such as metal working, many types of time saving dies and fixtures are used for aligning and locating tools. Although fixtures and dies can be expensive to fabricate, the time that is saved reduces labor costs sufficiently to make their use advantageous and cost effective.

Most dies and fixtures have a specific function. That is, they are useful only in a single or limited manufacturing procedure and/or with a single machine tool or system. For example, a subplate assembly and tooling set up for a routing and cutting machine is shown in U.S. Pat. No. 4,073,215, issued to Coope et al, on Feb. 14, 1978, entitled SUB PLATE ASSEMBLY FOR MACHINE TOOLS. The subplate assembly of that invention locates and aligns the bushings in the machine tool table and tooling members, eliminating the time usually devoted to the alignment of a piece of work with respect to its directions of movement.

In U.S. Pat. No. 4,017,267, issued on Apr. 12, 1977, to Hawley, entitled METHOD OF DIE CONSTRUCTION USING JOINT STRUCTURE, a series of die parts is precisely located upon a common die shoe to locate the die part on the shoe with respect to other die parts and with respect to the shoe. The assembly reduces the time required to assemble and precisely locate die parts on the die shoe. The fixture holds tolerances to ten thousandths of an inch.

In U.S. Pat. No. 5,788,225, issued on Aug. 4, 1998 to Iwata et al., entitled BASE AND FIXTURE TO BE USED IN MACHINING OPERATION, a machining device is disclosed in which a fixture is disposed on a base which, in turn, is disposed on a pallet. Essentially, the present invention eliminates the need for a dedicated base, yet can be used to perform the same functions addressed by Iwata.

The present invention seeks to expand the usefulness of metal working plate sleeves, so that they are portable and interchangeable with a master bushing. The sleeves introduced into the master bushing provide alignment and securement of work pieces. The master bushing is also designed to receive different sized screws and locating dowels or pins by the use of these removable inserts. Specifically designed cylindrical locators with clearance holes through the center for screws or studs provide the unique capability of locating and accepting differently sized studs or screws.

SUMMARY OF THE INVENTION

In accordance with the present invention, there is provided a kit comprising a number of portable, interchangeable elements that form a bushing assembly. The bushing assembly holds precise tolerances between these interchangeable, insertable elements, so that a unique capability for locating and accepting a stud or screw is provided. The bushing assembly includes a master bushing that comprises a round cylinder having a shoulder and a threaded center hole that can receive a number of elements. A first element includes a top plate, the threaded outer diameter of which has a clearance hole through its center. A second element features a square nut comprising a substantially square piece of material having a threaded hole through its center. A third element includes a locating pin containing two juxtaposed cylinders of different outer diameters and longitudinal length. These cylinders are in alignment about a common axis. A fourth element features a through hole locating pin, which includes two cylinders of different outer diameter and longitudinal length, juxtaposed with respect to each other. A centrally located clearance hole passes through the two cylinders about a common longitudinal axis. A fifth element comprises a locating plug comprising a cylindrical piece having a threaded outer diameter and a smooth, cylindrical, flanged top of slightly larger diameter. A concentric hole passes through the top and the threaded cylindrical piece. A sixth element features a spacer comprising a thin disk with a clearance hole passing through its center. A seventh and final element features a pallet plug. The pallet plug includes a cylinder having a threaded outer diameter and a smooth, cylindrical, flanged top of slightly larger diameter. A stepped cylindrical bore passes through the center axis of the pallet plug, defining a countersunk hole therein.

The elements and master bushing can be assembled in a plurality of ways to provide a unique bushing assembly. For example, the master bushing can receive the second element and the first element and different variations of cylindrical locators defined by variations of third, fourth, fifth, and seventh elements therein. The bushing assembly can also be designed as a means to accept a screw, by threading the top plate into the master bushing, using the spacer, and then the appropriate screw or stud.

The bushing assembly can also function as a locator for dowel pins, T-pins, and conical or tapered pins. To provide this function, the locating plug is threaded into the master bushing. Another variation is utilizing the locating pin (the third element). Specifically designed cylindrical locators with clearance holes through the center for screws or studs provide a unique ability to locate and accept a stud or a screw. This is accomplished by installing the second element into the master bushing; then the first element. Thereafter, the fourth element is installed in the through hole locating pin. Thereafter, a screw or stud is introduced. Still another combination features inserting the square nut into the master bushing and then threading the seventh element (pallet plug) into the master bushing.

It is an object of this invention to provide a universal kit of interchangeable elements that, when inserted into a master bushing, provides different workpiece handling functions.

It is another object of the invention to provide a portable kit of interchangeable elements in combination with a master bushing for accomplishing a variety of workpiece handling objectives, such as locating and aligning objects.

BRIEF DESCRIPTION OF THE DRAWINGS

A complete understanding of the present invention may be obtained by reference to the accompanying drawings, when considered in conjunction with the subsequent detailed description, in which:

FIGS. 1a, 1b, and 1c illustrate respective top, back, and sectional views of the master bushing of the kit of this invention. FIG. 1c is a sectional view taken along lines A—A of FIG. 1a;

DESCRIPTION OF THE PREFERRED EMBODIMENT

Generally speaking, the invention features a universal workpiece handling kit comprising a plurality of interchangeable elements that combine with a master bushing to perform different functions and objectives.

Figure 2B:
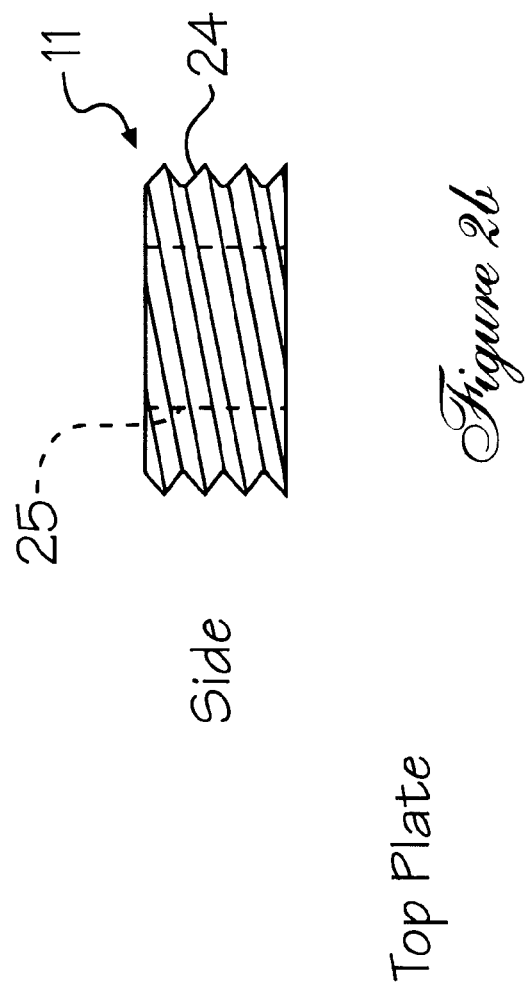
FIGS. 2a and 2b depict respective top and side views of the top plate of the kit of this invention.
Figure 2A:
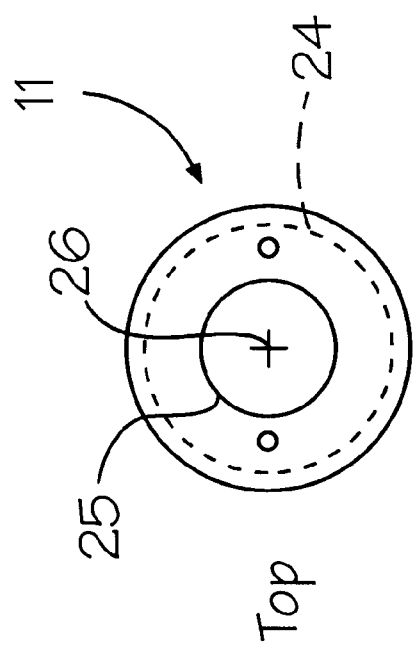
Figure 3B:
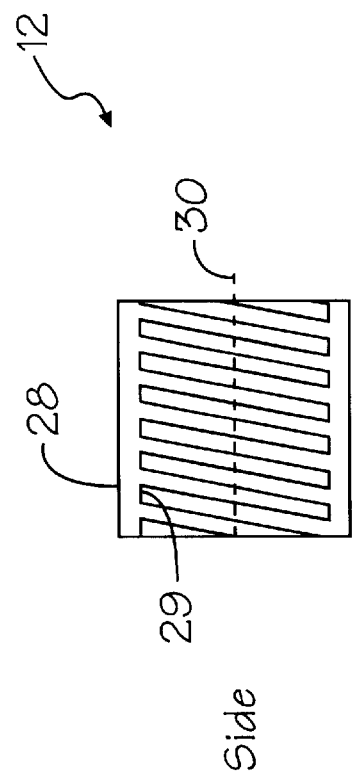
FIGS. 3a and 3b show respective top and side views of the square nut of the kit of this invention.
Figure 3A:
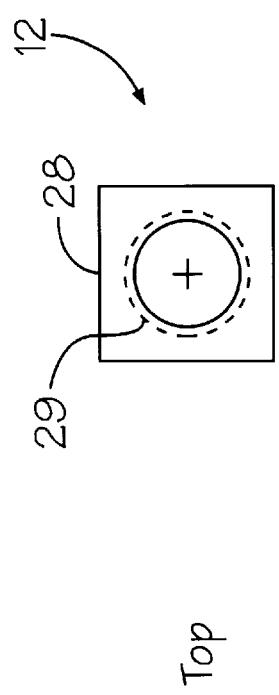
Figure 4B:
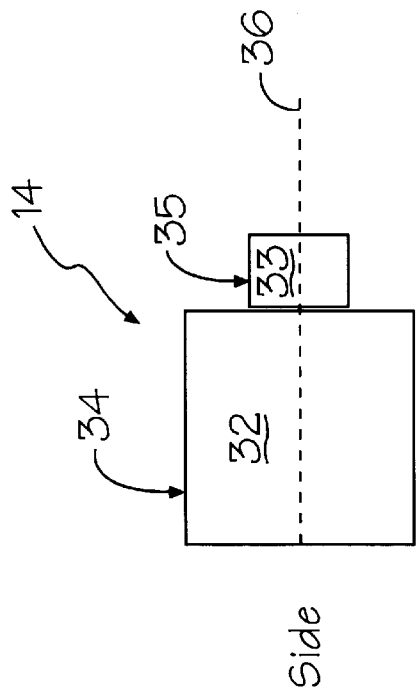
FIGS. 4a and 4b illustrate respective top and side views of the locating pin of the kit of this invention.
Figure 4A:
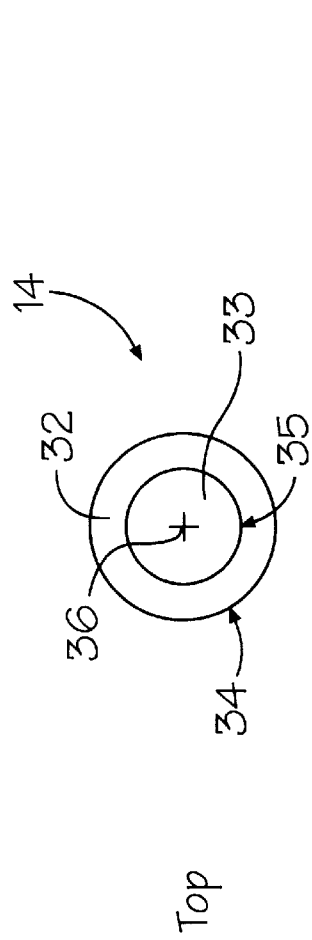
Figure 5B:
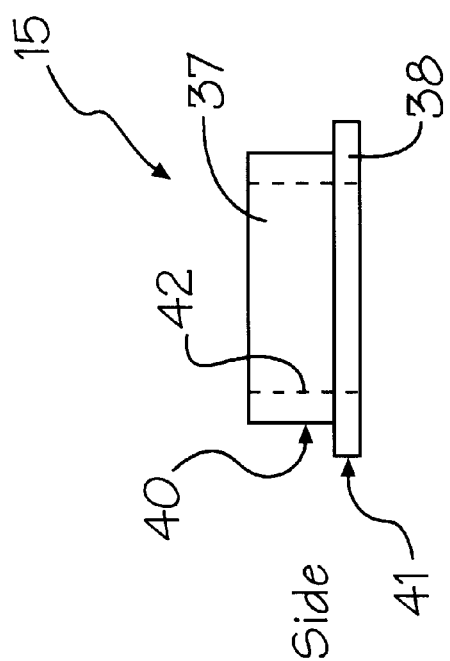
FIGS. 5a and 5b depict respective top and side views of the through hole locating pin of the kit of this invention.
Figure 5A:
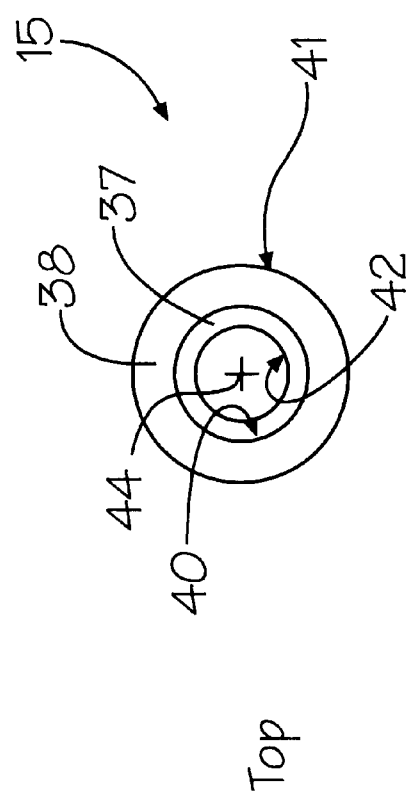
Figure 6B:
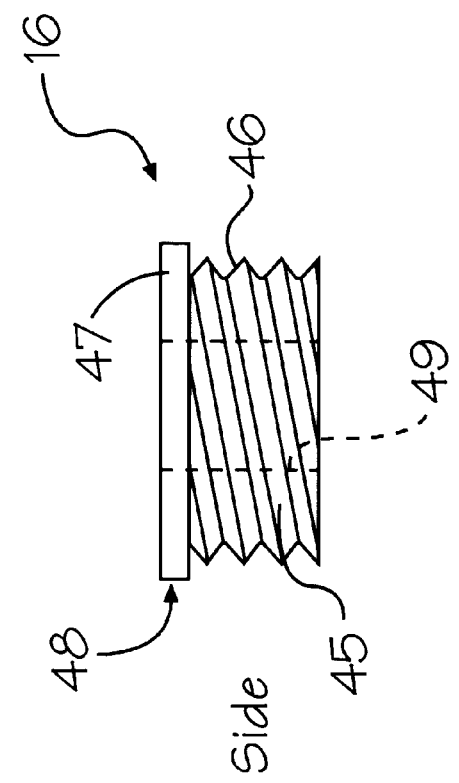
FIGS. 6a and 6b depict respective top and side views of the locating plug of the kit of this invention.
Figure 6A:
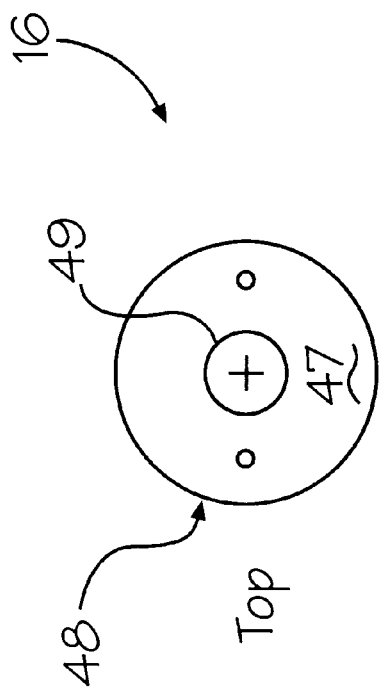
Figure 7B:
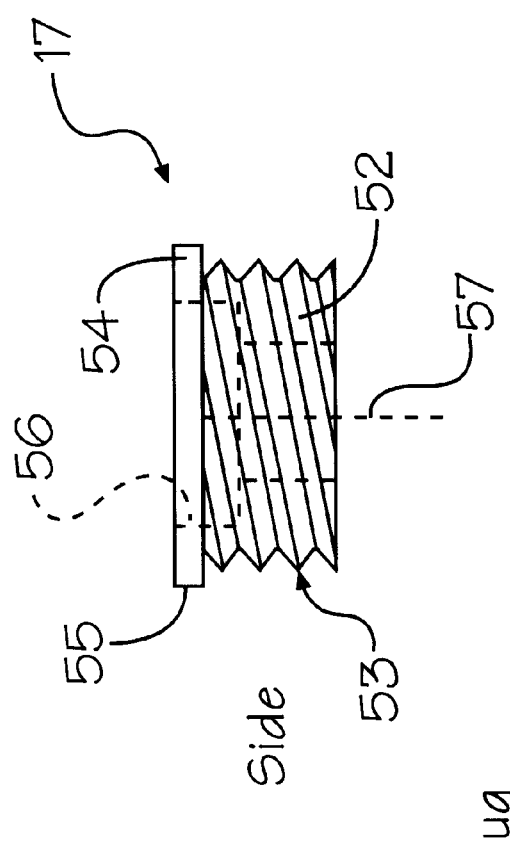
FIGS. 7a and 7b depict respective top and side views of the pallet plug of the kit of this invention.
Figure 7A:
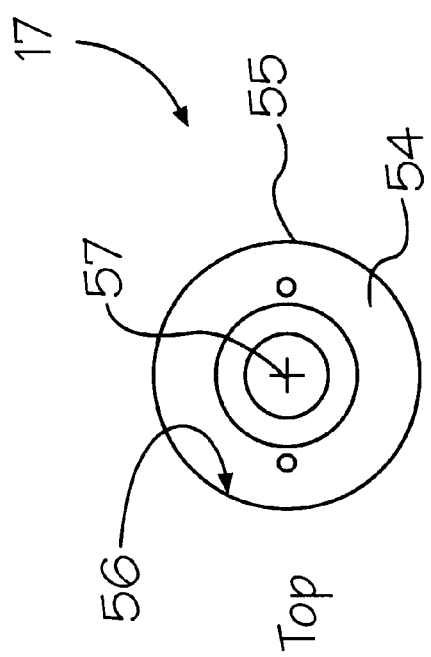
Figure 8B:
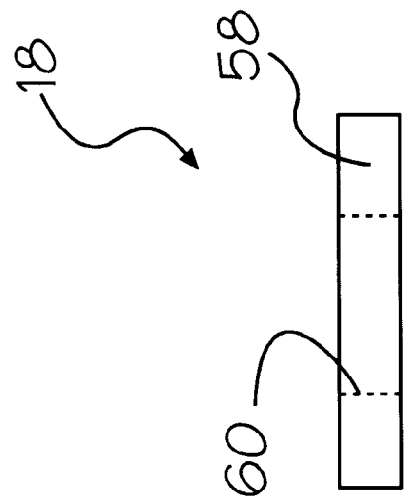
FIGS. 8a and 8b depict respective top and side views of the spacer of the kit of this invention.
Figure 8A:
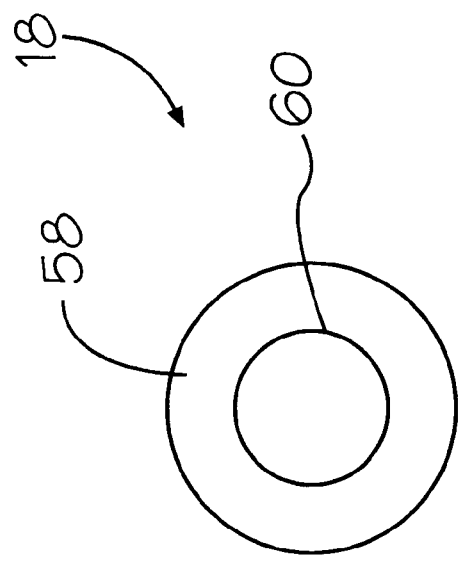

Now referring to FIGS. 1a, 1b, 1c through FIG. 9, the plurality of elements of the kit of this invention are illustrated, including: a master bushing 10, top plate 11, illustrated in FIG. 2a, square nut 12, locating pin 14, through hole locating pin 15, locating plug 16, pallet plug 17, spacer 18 and conical locating pin, described hereinbelow.

The master bushing 10 comprises a round cylinder 20 having a shoulder 21 and a threaded center hole 22 that can receive a number of elements and an internal shoulder 20a that acts as a stop to limit the advancement of elements for the purpose of providing accurate positioning. The first element includes top plate 11, the threaded outer diameter 24 of which has a clearance hole 25 through its center 26. The second element features square nut 12 comprising a substantially square piece of material 28 having a threaded hole 29 through its center 30. The third element of the kit includes locating pin 14 containing two juxtaposed cylinders 32 and 33. The cylinders 32 and 33 have different outer diameters 34 and 35, respectively, and different longitudinal lengths. The cylinders 32 and 33 are in alignment about a common axis 36. The fourth element features through hole locating pin 15, which includes two cylinders 37 and 38 of different outer diameters 40 and 41, respectively, and different longitudinal lengths. The cylinders 37 and 38 are juxtaposed with respect to each other. A centrally located clearance hole 42 passes through the two cylinders 37 and 38 about a common longitudinal axis 44. The fifth element is locating plug 16 comprising a cylindrical piece 45 having a threaded outer diameter 46, and a smooth, cylindrical, flanged top 47 of slightly larger diameter 48. A concentric hole passes 49 through the top 47 and the threaded cylindrical piece 45. The sixth element features pallet plug 17. The pallet plug 17 includes a cylinder 52 having a threaded outer diameter 53, and a smooth, cylindrical, flanged top 54 of slightly larger diameter 55. A stepped cylindrical bore 56 passes through the center axis 57 of the pallet plug 17, defining a countersunk hole therein. The seventh element features spacer 18, comprising a thin disk 58 with a clearance hole 60 passing through its center.

The elements 11 through 18 and the master bushing 10 can be assembled in a plurality of ways to provide a unique bushing assembly. For example, master bushing 10 can receive the second element 12 and the first element 11 and different variations of cylindrical locators defined by variations of square nut 14, through hole locating pin 15, locating plug 16, and pallet plug 17.

The bushing assembly can also be designed as a means to accept a screw, by threading the top plate 11 into the master bushing 10, using the spacer 18, and then the appropriate screw or stud.

The bushing assembly can also function as a locator for dowel pins, T-pins, and tapered pins. To provide this function, the locating plug 16 is threaded into the master bushing 10.

Another variation is utilizing the through hole locating pin 15. Specifically designed cylindrical locators with clearance holes through the center for screws or studs form a unique ability to locate and accept a stud or a screw. This is accomplished by installing the square nut 12 (FIG. 3b) into the master bushing 10 and then the top plate 11. Thereafter, the through hole locating pin 15 is installed. A screw or stud is then introduced. Still another combination features inserting the square nut 12 into the master bushing 10, and then threading the pallet plug 17 into the master bushing 10.

Figure 9:
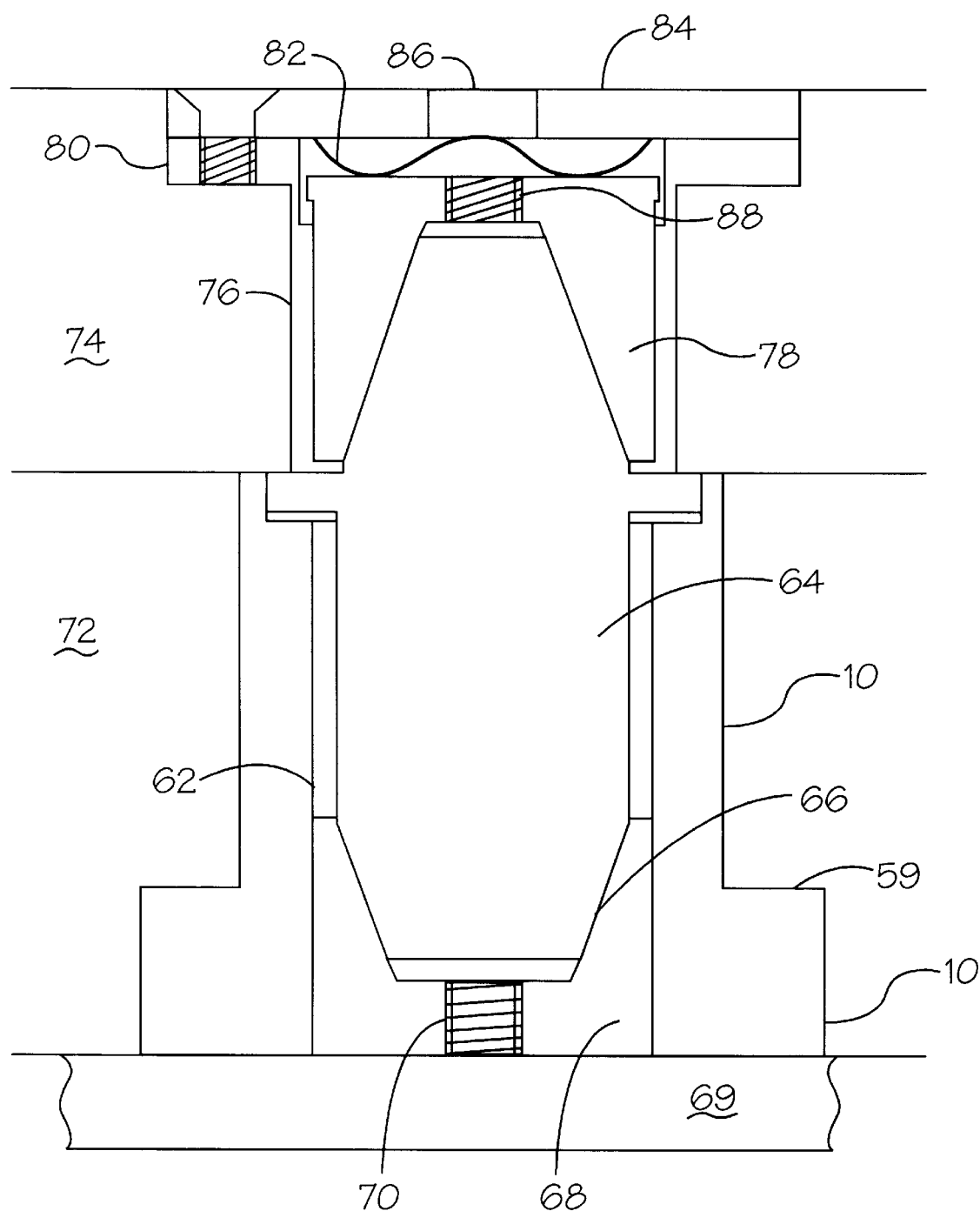
FIG. 9 is a sectional view of the fixture base and subplate of the kit of this invention.

Referring now to FIG. 9, there is shown a cross-section of the fixture base and subplate of this invention. Master bushing 10 is disposed on machine table 69. A cavity 62 is formed in master bushing 10. Cavity 62 holds a conical locating pin 64, which is tapered slightly at its lower end 66. A master bushing conical insert 68 is located inside the bottom of master bushing 10. Formed in the approximate center of master bushing conical insert 68 is a threaded hole 70 for insertion and retraction. Master bushing 10 is installed in subplate 72, as shown in the FIGURE.

Above the upper surface of subplate 72 is disposed a fixture base 74. A cavity 76 is formed in fixture base 74. The upper portion of conical locating pin 64 is housed in conical fixture base insert 78 which, in turn, is slip fit into fixture base insert 80. Fixture base insert 80 is, in turn, press-fit into cavity 76.

A spring washer 82 is provided above conical fixture base insert 78 for providing a downward force against the taper of conical locating pin 64. Connected to the upper portion of fixture base insert 80 is a cover plate 84, which secures the components of the fixture to one another.

A clearance hole 86 in cover plate 84 allows an operator to turn a screw, not shown, in screw hole 88 in order to break vacuum of the conical locating pin 64 for removal.

Thus, it can be seen that subplate 72 can be used both for housing conical locating pin 64 or for forming the base for any other of the components mentioned hereinabove. Master bushing 10 has a shoulder 59, surrounding the lower portion thereof, as shown in FIG. 9.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

For example, the invention includes the aforementioned elements but is not limited thereto. Other elements as might occur to those skilled in the art are meant to be included as part of the inventive scope.

Having thus described the invention, what is desired to be protected by Letters Patent is presented in the subsequently appended claims.

What is claimed is:

1. A kit for expanding the usefulness of a plurality of metal working plate sleeve elements so that they subsequently interact with a master bushing, said plurality of metal working plate sleeve elements being subsequently introduced to said master bushing to provide alignment and securement of a work piece therein, said kit comprising said master bushing and said plurality of said interacting metal working plate sleeve elements said master bushing being subsequently disposed in a subplate, said master bushing having a cavity therein for receiving certain ones of said plurality of interacting metal working plate sleeve elements, said plurality of interacting metal working plate sleeve elements consisting of: a top plate, square nut, locating pin, through hole locating pin, locating plug, pallet plug, conical locating assembly, and a spacer.

2. The kit in accordance with claim 1, wherein said cavity of said master bushing comprises means defining a cylindrical threaded center hole that can receive at least one of said plurality of interacting metal working plate sleeve elements.

3. The kit in accordance with claim 1, wherein the top plate comprises a cylindrical piece having a threaded outer diameter, and a clearance hole through a center portion thereof.

4. The kit in accordance with claim 1, wherein the square nut comprises a substantially square piece of material having a threaded hole through a center portion thereof.

5. The kit in accordance with claim 1, wherein the locating pin contains two juxtaposed cylinders having different, respective outer diameters and different longitudinal lengths, said cylinders being subsequently in alignment about a common axis.

6. The kit in accordance with claim 1, wherein the through hole locating pin comprises two cylinders of different, respective outer diameters and different longitudinal lengths, and further wherein the cylinders are subsequently juxtaposed with respect to each other, said cylinders having means defining a centrally located clearance hole that passes through the cylinders about a common longitudinal axis when subsequently juxtaposed.

7. The kit in accordance with claim 1, wherein the locating plug comprises a cylindrical piece having a threaded outer diameter and a smooth, cylindrical, flanged top of slightly larger diameter than said threaded outer diameter, said cylindrical piece having means defining a concentric hole that passes therethrough including the cylindrical, flanged top.

8. The kit in accordance with claim 1, wherein the pallet plug includes a cylinder having a threaded outer diameter and a smooth, cylindrical, flanged top of larger diameter than said threaded outer diameter, and further wherein said cylinder and said flanged top comprise means defining a stepped cylindrical bore that passes through a center axis thereof.

9. The kit in accordance with claim 1, wherein the spacer comprises a thin disk with a clearance hole passing through a center portion thereof.

10. The kit in accordance with claim 1, wherein the master bushing subsequently receives the square nut and top plate to form a metal working combination.

11. The kit in accordance with claim 1, wherein the master bushing subsequently receives cylindrical locators defined by said metal working sleeve elements consisting of: said through hole locating pin, said locating plug, said pallet plug, and said conical locating pin assembly.

12. The kit in accordance with claim 10, wherein the master bushing subsequently accepts a screw or stud by subsequently inserting said square nut and threading said top plate into the master bushing using the spacer, and then an appropriate screw or stud.

13. The kit in accordance with claim 1, wherein the master bushing, in subsequent combination with said locating plug, functions as a locator for dowel pins, T-pins, and tapered pins.

14. The kit in accordance with claim 1, wherein the master bushing subsequently receives said square nut and then the top plate, after which the through hole locating pin is subsequently installed, and a screw or stud is introduced therein.

15. The kit in accordance with claim 1, wherein the master bushing subsequently receives the square nut, and then said pallet plug is subsequently threaded into the master bushing.

16. The kit in accordance with claim 1, wherein said master bushing comprises a shoulder for subsequently securing said master bushing into said subplate.

17. A universal, portable kit for expanding the usefulness of metal working plate sleeve elements so that they subsequently interact with a master bushing, said metal working plate sleeves being subsequently introduced to said master bushing to provide alignment and securement of a work piece therein, comprising a plurality of interacting metal working plate sleeve elements that subsequently combine in different combinations with said master bushing that is subsequently disposed in a subplate, said master bushing having a cavity therein, said plurality of interacting metal working plate sleeve elements consisting of: a top plate, square nut, locating pin, through hole locating pin, locating plug, pallet plug, conical locating assembly, and spacer.

\* \* \* \* \*